United States Patent
Schwiese et al.

(10) Patent No.: US 8,360,125 B2
(45) Date of Patent: Jan. 29, 2013

(54) FLEXIBLE INDUCTOR FOR THE INDUCTIVE SEALING OF PACKAGES

(75) Inventors: Hans-Joachim Schwiese, Freiburg (DE); Jens-Uwe Mohring, Buchenbach (DE)

(73) Assignee: HUETTINGER Elektronik GmbH + Co. KG, Freiburg (DE)

( * ) Notice: Subject to any disclaimer, the term of this patent is extended or adjusted under 35 U.S.C. 154(b) by 1020 days.

(21) Appl. No.: 12/042,727

(22) Filed: Mar. 5, 2008

(65) Prior Publication Data

US 2008/0216960 A1    Sep. 11, 2008

(30) Foreign Application Priority Data

Mar. 6, 2007  (EP) ..................................... 07004550

(51) Int. Cl.
*B29C 65/02* (2006.01)
(52) U.S. Cl. ................. 156/380.2; 156/379.6
(58) Field of Classification Search ............. 156/272.2, 156/379.6, 380.2, 380.3, 380.4, 380.9
See application file for complete search history.

(56) References Cited

U.S. PATENT DOCUMENTS

| | | | |
|---|---|---|---|
| 3,431,382 A | | 3/1969 | Esche et al. |
| 3,467,806 A | * | 9/1969 | Dixon ........................... 219/659 |
| 4,095,390 A | | 6/1978 | Knudsen |
| 4,185,183 A | | 1/1980 | Kamimoto |
| 4,506,125 A | | 3/1985 | Smets et al. |
| 4,539,456 A | * | 9/1985 | Mohr ............................ 219/604 |
| 4,740,663 A | * | 4/1988 | Roth et al. ..................... 219/660 |
| 4,778,971 A | * | 10/1988 | Sakimoto et al. ............. 219/645 |
| 4,828,227 A | | 5/1989 | Georges et al. |
| 5,055,647 A | | 10/1991 | Heyes et al. |
| 5,786,575 A | * | 7/1998 | Bleske et al. .................. 219/633 |
| 6,153,864 A | | 11/2000 | Hammen et al. |
| 6,255,634 B1 | * | 7/2001 | Bowers .......................... 219/636 |
| 6,365,883 B1 | * | 4/2002 | Pohl ............................... 219/634 |
| 2001/0032839 A1 | | 10/2001 | Herzog |
| 2001/0048203 A1 | | 12/2001 | Hammen et al. |
| 2003/0062130 A1 | | 4/2003 | Hammen et al. |
| 2003/0089079 A1 | | 5/2003 | Rea et al. |
| 2005/0224184 A1 | | 10/2005 | Hammen et al. |

FOREIGN PATENT DOCUMENTS

| | | |
|---|---|---|
| DE | 1182373 | 11/1964 |
| DE | 1565376 | 2/1970 |
| DE | 254681 A1 | 3/1988 |
| DE | 69017058 | 6/1995 |
| EP | 0842854 | 5/1998 |
| EP | 1221826 | 7/2002 |
| FR | 2593467 | 7/1987 |

OTHER PUBLICATIONS

Ballerstaedt, "Seal Systems—Induktions-Siegel-Einlagen", 6 pages.
International Search Report from corresponding European Patent Application No. 07004550.5, mailed Aug. 7, 2008, 4 pages.

* cited by examiner

*Primary Examiner* — Daniel McNally
(74) *Attorney, Agent, or Firm* — Fish & Richardson P.C.

(57) ABSTRACT

A sealing device for inductive sealing of containers is provided. The sealing device includes at least one induction coil made from an at least partially flexible conductor. The induction coil has two coil halves arranged at a distance (d) apart between which the containers can be moved, in which the conductor in each case extends essentially parallel to a direction of motion (B) of the containers. The coil halves are connected to the induction coil via at least one flexible conductor loop, which extends perpendicular to the direction of motion (B) of the containers.

20 Claims, 4 Drawing Sheets

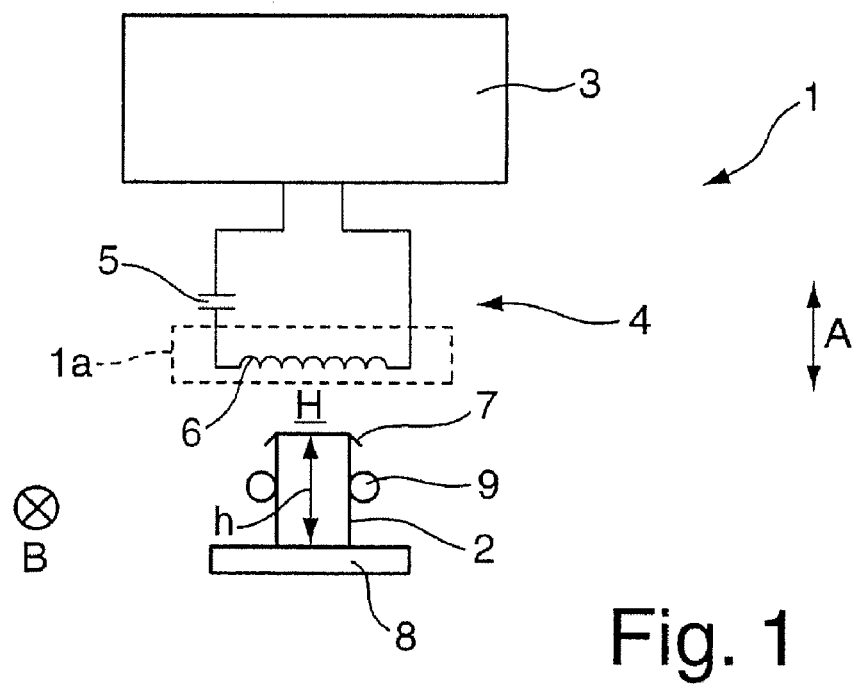
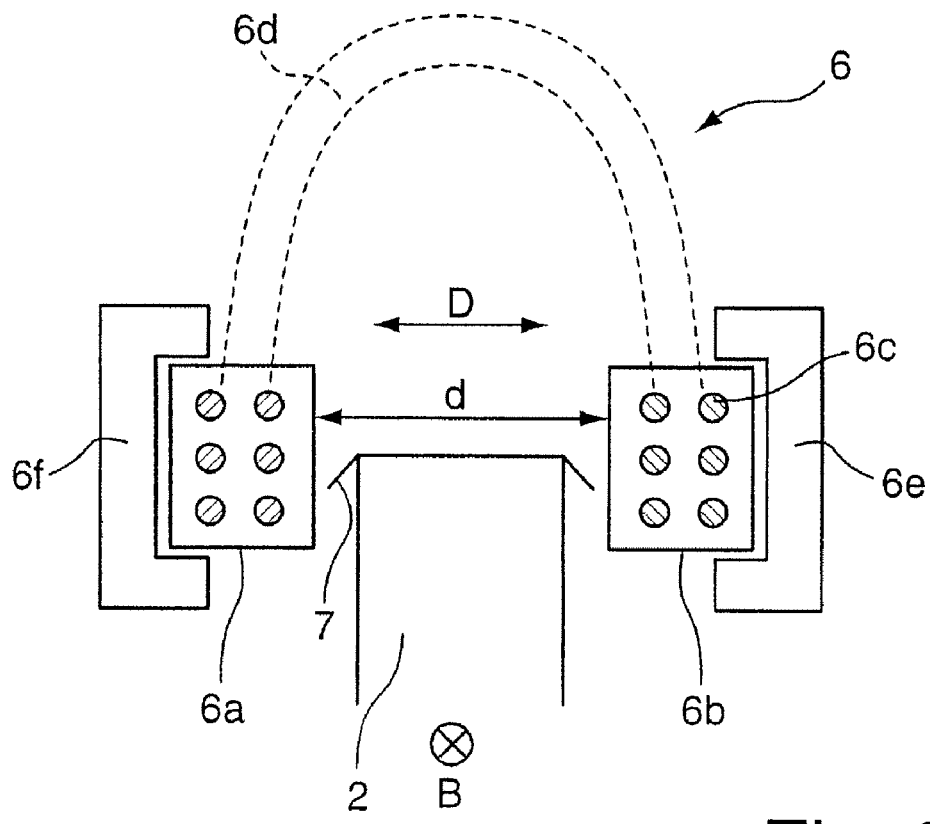

FLEXIBLE INDUCTOR FOR THE INDUCTIVE SEALING OF PACKAGES

CROSS REFERENCE TO RELATED APPLICATIONS

This application claims priority under 35 USC §119(a) from European patent application EP 07 004 550.5, filed Mar. 6, 2007. The complete disclosure of this priority application is incorporated herein by reference.

TECHNICAL FIELD

The present invention relates to a sealing device for the inductive sealing of containers passed through the sealing device by fusion of a container opening with a sealing film.

BACKGROUND

Devices for inductive sealing comprise essentially a high-frequency generator (HF-Generator) and an induction coil (or briefly: coil), which is arranged in a sealing head. The coil can be constructed flat or tunnel-shaped and in addition can be surrounded by a ferrite enclosure, which concentrates the electromagnetic field in the application direction. The coil is normally connected into a series resonant circuit, which is driven at close to the resonance frequency, in order to generate current overshoots in the coil.

The sealing head is normally arranged above a conveying device, which enables the containers to be sealed or packages to be conveyed through under the coil. The containers are closed by means of a lid that can be screwed on or snapped into place, which contains a metal foil and an adjacent plastic sealing film. On account of the induction coil, eddy currents are generated in the metal foil, which heat up the metal foil. Due to the contact between the metal foil and the sealing film, the sealing film is also heated up and is thereby fused with the container opening. Tunnel-shaped induction coils have the advantage over flat coils that even containers with a large distance between the metal foil and the top edge of the lid can be sealed, as the coil acts on the metal foil from the side.

It is known from EP 0 842 854 B1 (DE 697 04 191 T2) to configure the geometry of a sealing head with a tunnel-shaped induction coil in such a way that container openings of various widths can be sealed. In this device there is a step-shaped opening in the sealing head, which in operation receives container lids of different widths in its different-sized opening sections. A disadvantage of the device described in EP 0 842 854 B1 however is the fact that it is only optimally matched to container lids of pre-specified size, and that the action of the electromagnetic field of the induction coil on the containers takes place mainly from above, so that containers with tall lids, i.e. with a large distance between the top edge of the lid and the internal metal foil can only be poorly sealed.

SUMMARY

The present invention features a device of the kind described above for the inductive sealing of container openings, which allows containers of variable lid shape, height and size to be sealed simply and efficiently.

According to one aspect, the invention features a sealing device for the inductive sealing of containers passed through the sealing device by fusion of a container opening with a sealing film. The sealing device includes at least one induction coil made of an at least partially flexible conductor. The induction coil has two coil halves arranged a distance apart, in which halves the conductor in each case extends essentially parallel to a direction of motion of the containers, and between which the containers can be passed through. The coil halves are connected to the induction coil via at least one flexible conductor loop, which extends perpendicular to the direction of motion of the containers. The conductor thus has a flexible construction, at least in the region of the conductor loop.

The two parallel halves of the coil winding thus form a tunnel, through which a container to be sealed is moved. The action of the electromagnetic field of the induction coil on the containers takes place therefore from the side, so that containers with tall lids can also be properly sealed. Moreover, the electromagnetic field of the induction coil in this manner acts directly on the edge of the metal foil located in the container lid, where the generation of heat for the sealing process is desired.

According to a particular configuration of the present invention a sealing device includes an induction coil which consists entirely of flexible litz wire. The litz wire extends in multiple windings essentially in two parallel coil halves parallel to the direction of motion of the containers to be sealed, and moreover forms a number of conductor loops perpendicular to this direction of motion and also perpendicular to the plane of the container opening. The configuration of the induction coil from a flexible, multi-core conductor in the form of litz wire makes expensive water-cooling of the coil unnecessary. The cooling of the coil can be carried out in a simple and low-cost manner by the use of air.

The conductor loops discussed above enable a parallel displacement of the coil or winding halves, which are parallel in their normal position, relative to one another. This arrangement allows a variable distance to be progressively adjusted between the parallel coil halves. In this manner, containers with different opening widths can be sealed. The conductor loops extend out of the plane of the container opening a sufficient distance to present no obstruction to the motion of the containers.

In a preferred embodiment the coil halves can also be positioned at an angle to each other, in order to affect the action of the electromagnetic field of the coil on the containers. The said angle included between the coil halves can lie in a plane of the container motion or of the container opening, and/or in a plane perpendicular thereto.

Generally the coil halves can accordingly be arranged at a finite angle to each other, wherein the angle is defined in relation to the direction of motion of the container and/or in relation to a direction perpendicular to this. The phrase "finite angle" refers herein to an angular dimension not equal to zero degrees (0°).

Preferably the induction coil is arranged in a sealing head that can be displaced at least perpendicularly to the direction of motion of the container, in such a way that containers with variable lid heights can be sealed. In other words, the induction coil is movable perpendicularly to the direction of motion of the containers.

It is particularly preferable for the induction coil to be connected in a circuit with at least one capacitor or with a capacitance in a serial resonant circuit, in order to generate current overshoots in the coil. This entire resonant circuit is then arranged in the sealing head, which is connectable via a flexible connector, for example connecting leads (cables) to the high-frequency generator. This enables a simple exchange of a sealing head, comprising at least the coil, the capacitance and suitable connecting means for connecting to the HF generator, of an existing sealing device with a sealing head as described herein. This exchangeability is advantageous for retrofitting purposes.

In an embodiment of the invention the induction coil is divided into multiple sub-coils, between which at least one capacitor or a capacitance is arranged. In this manner the voltage in the individual sub-coils can be reduced, in order to prevent voltage discharges.

In order to concentrate the electromagnetic field of the induction coil, it is possible to surround the parallel winding halves of the coil with an enclosure made of a material that is a good magnetic conductor (i.e., having a magnetically permeability $\mu_r$>50) and a poor electrical conductor (i.e., having a specific resistance $\rho$>50 $\Omega mm^2/m$), for example ferrite.

For a simple application of the sealing head, the (parallel) displacement of the coil halves of the induction coil preferably occurs synchronously with an adjustment of a guiding unit for the containers to be sealed. To this end, the mechanical adjustment device of the coil and the adjustment device of the container guide are cooperatively coupled or preferably identical, i.e. they are constructed in the form of a joint adjustment device.

The details of one or more embodiments of the invention are set forth in the accompanying drawings and the description below. Other features and advantages of the invention will be apparent from the description and drawings, and from the claims.

DESCRIPTION OF DRAWINGS

FIG. 1 is a basic schematic illustration of a sealing device for the inductive sealing of containers.

FIG. 2 shows a first configuration of the induction coil in the sealing head of a sealing device in cross-section.

DETAILED DESCRIPTION

Figure 3:
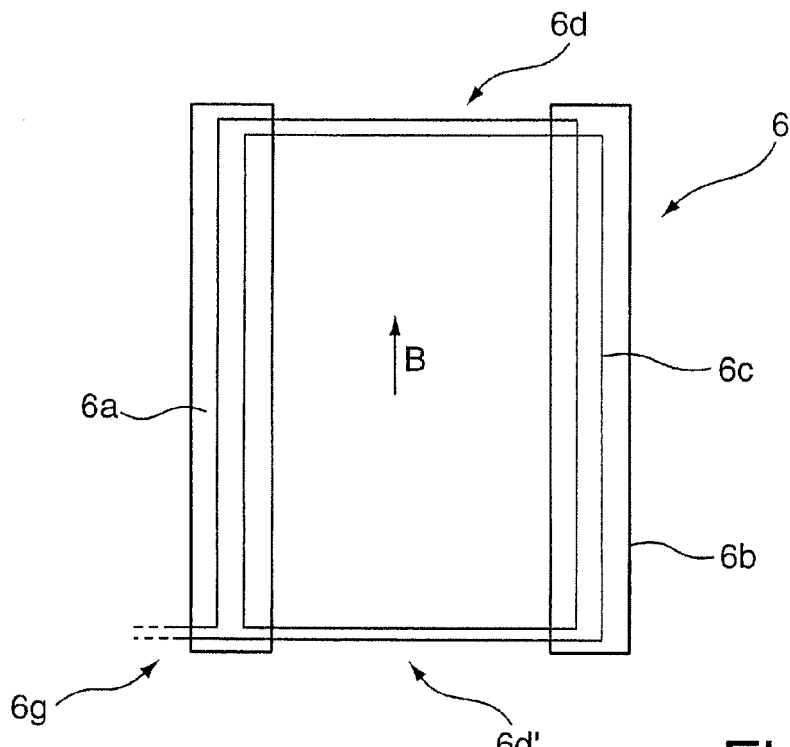
FIG. 3 is a top view of a configuration of the induction coil according to FIG. 2.

FIG. 1 is a basic schematic illustration of an inventive sealing device 1 for the inductive sealing of containers or packages 2. The sealing device 1 has a high-frequency generator (HF generator) 3 connected to a resonant circuit 4. The resonant circuit 4 comprises a capacitance 5, which is connected in series with an induction coil (inductance) 6 in order to achieve a current overshoot. At least the induction coil 6 (cf. FIG. 8) is arranged in a movable sealing head 1a of the sealing device 1. The sealing head 1a is movable as a whole at least in the direction of the double arrow A, in order to adapt the sealing device 1 to different height dimensions h of the containers 2 to be sealed.

Figure 8:
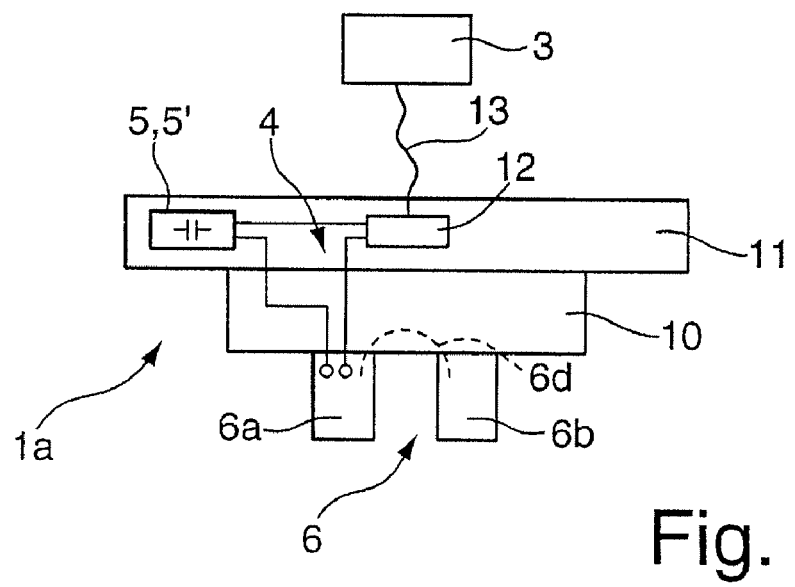
FIG. 8 shows a sealing head consisting of an induction coil, a capacitance, an adjustment device and a connector, mounted on a replaceable frame part.

In some implementations (e.g., as shown in FIG. 8), the entire resonant circuit 4 is arranged in the sealing head, and the sealing head is flexibly connected to the HF generator via a connector, for example flexible connecting leads (cables). This arrangement facilitates replacement of the sealing head in an existing sealing device with a sealing head as described herein.

In the current-flowing state the induction coil 6 generates an electromagnetic field H, in the region of which is arranged a container 2 to be sealed, with a container opening covered by a sealing film 7. The container 2 is typically moved by a conveying device 8, such as a conveyor belt, if necessary in connection with a guiding device 9. Movement is in a container direction of motion B through the region of the magnetic field H, i.e. through the sealing device 1. This causes the sealing film 7 to be heated and fused with the material of the rim of the container 2, so that the container opening is sealed. Referring to FIG. 2, the induction coil 6 is constructed as a tunnel-shaped induction coil or tunnel inductor, as will be discussed in detail below.

FIG. 2 shows a first configuration of the induction coil 6. The induction coil 6 has two coil halves, namely a first coil half 6a and a second coil half 6b. The induction coil 6 is constructed of multiple windings, using a flexible, multi-core conductor in the form of a litz wire 6c. The sections of the litz wire in the first and second coil halves 6a, 6b each run essentially parallel to one another and essentially parallel to the direction of motion B of the containers 2, and thus in FIG. 2 are shown in cross-section. The use of the term "essentially" is intended to express the fact that, in the context of the present invention, configurations of the induction coil 6 are also possible in which the first and second coil halves 6a, 6b are arranged at a finite angle with respect to each other and/or in relation to the direction of motion B, that is to say an angle not equal to 0° and preferably between 0° and 45°, which will be discussed in more detail below (cf. FIGS. 6 and 7).

In order to create the induction coil 6, the two coil halves 6a, 6b, are connected by further litz wire sections, shown dashed schematically in FIG. 2, which together form a conductor loop 6d, which extends perpendicular to the direction of motion B and perpendicular to a plane containing the opening of the container 2. A tunnel-shaped induction coil 6 (tunnel inductor) is thus formed. Although only a single conductor loop 6d is illustrated in FIG. 2, a plurality of conductor loops 6d can also be provided in the direction of a longitudinal extent of the coil halves 6a, 6b, in particular two, for example one conductor loop on each end of the two coil halves 6a, 6b. Due to the use of a flexible conductor 6c and the construction of conductor loops 6d, the two coil halves 6a, 6b are able to be simply displaced in parallel in the direction of the double arrow D. Accordingly, a distance d can be progressively adjusted between the two coil halves 6a, 6b, in order thus to be able to react flexibly to different container dimensions. The conductor loop 6d is additionally constructed and dimensioned in such a way that containers 2 with tall lids, i.e. with a large distance between the top edge of the lid and the sealing film 7, can pass unhindered through the induction coil tunnel.

According to the exemplary embodiment of FIG. 2, the two coil halves 6a, 6b on their respective sides facing away from the container 2 are surrounded by a partial enclosure 6e or 6f, which is made from a material that has good magnetic conductivity and poor electrical conductivity. Preferably, but without restriction, this material is a ferritic material (ferrite). In this way the field generated by the induction coil 6 can be concentrated onto the region between the two coil halves 6a, 6b.

FIG. 3 shows a schematic top view of the induction coil 6 according to FIG. 2, in this case in a configuration with two conductor loops 6d, 6d', through which a single induction coil 6 is formed. Connectors 6g are provided for connecting the induction coil 6 with the other components of the sealing device shown in FIG. 1, in particular with the capacitance 5 and the HF generator 3.

Figure 4:
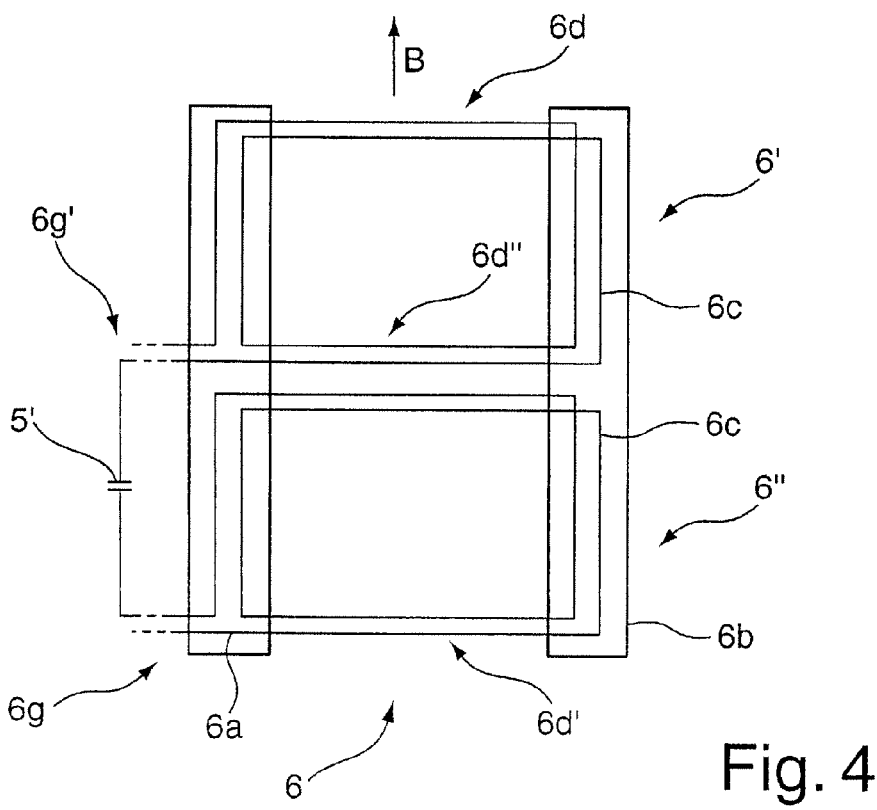
FIG. 4 is a top view of a further configuration of the induction coil according to FIG. 2.

As shown in FIG. 4, it is also possible to assemble the induction coil 6 from a number of sub-coils 6', 6", in such a way that correspondingly more conductor loops 6d-6d" and connections 6g, 6g' are produced. In this manner, further capacitances 5' can be connected between the individual sub-coils 6', 6", so that the voltage in the individual sub-coils 6', 6" can be reduced, in order to prevent voltage discharges. Alternatively it is possible to embody the sub-coils 6', 6" in such a way that only two conductor loops are produced.

Figure 5:
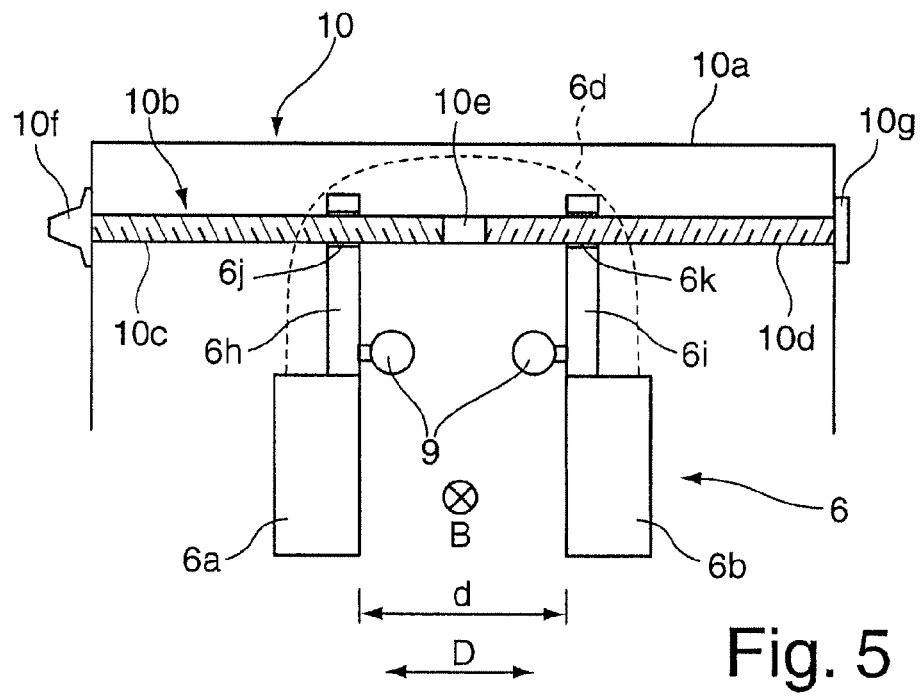
FIG. 5 shows a further configuration of the induction coil in an inventive sealing device with an adjustment device for the induction coil, in cross-section.

FIG. 5 shows schematically an adjustment device 10 for the induction coil 6, i.e. for the arrangement made from the two coil halves 6a, 6b. It has a structural element or housing part 10a that is U-shaped in cross-section, which is penetrated over its entire cross-section by a double-threaded bolt 10b. The double-threaded bolt 10b has a first threaded section 10c and a second threaded section 10d, wherein the thread in the second threaded section 10d runs in the opposite direction to the thread in the first threaded section 10c. A middle section 10e of the double-threaded bolt 10b is thread-less. On one end of the threaded bolt 10b there is a control element 10f in the form of a rotary knob; the other end of the double-threaded bolt 10b is held on the structural element 10a by means of an abutting part 10g. The two coil halves 6a, 6b each have an attachment part 6h, 6i extending in a direction perpendicular to the container direction of motion B and in the direction of extension of the conductor loop 6d. Each attachment part has a through hole 6j, 6k with internal thread on its free end for accommodating the double-threaded bolt 10b. On their respective inner sides, that is to say on the side facing the containers to be sealed (here not shown), the attachment parts 6h, 6i may have the container-guiding device 9 already mentioned with reference to FIG. 1.

Accordingly, rotation of the rotary knob 10f, via a movement of the double-threaded bolt 10b, effects a parallel displacement of the two coil halves 6a, 6b in the direction of the double arrow D. This displacement leads to a constant change in the distance d between the coil halves 6a, 6b over their entire length. Due to the mechanical, cooperative coupling between the induction coil 6 or the two coil halves 6a, 6b on the one hand, and the attachment parts 6h, 6i on the other, a corresponding adaptation of the container-guiding device 9 is achieved at the same time.

The adjustment possibilities are not limited to the previously described adjustment by hand. In particular, the rotational movement of the double-threaded bolt 10b described can also be effected by suitably controlled electrical driving means (not shown) or the like. The displacement of the coil halves in direction D to adapt to different container widths can similarly be electrically driven and/or controlled. If desired, the sealing device may have corresponding suitable sensors (not shown) for determining the container width.

In some implementations, an adjustment device 10 according to FIG. 5 is provided at a front end and a second adjustment device 10' is provided at a rear end of the two coil halves 6a, 6b (the front and rear ends being in the container direction of motion B). The coil halves 6a, 6b can also be arranged at a finite angle not equal to 0° relative to the container direction of motion B. This arrangement is shown schematically in FIG. 6.

Figure 6:
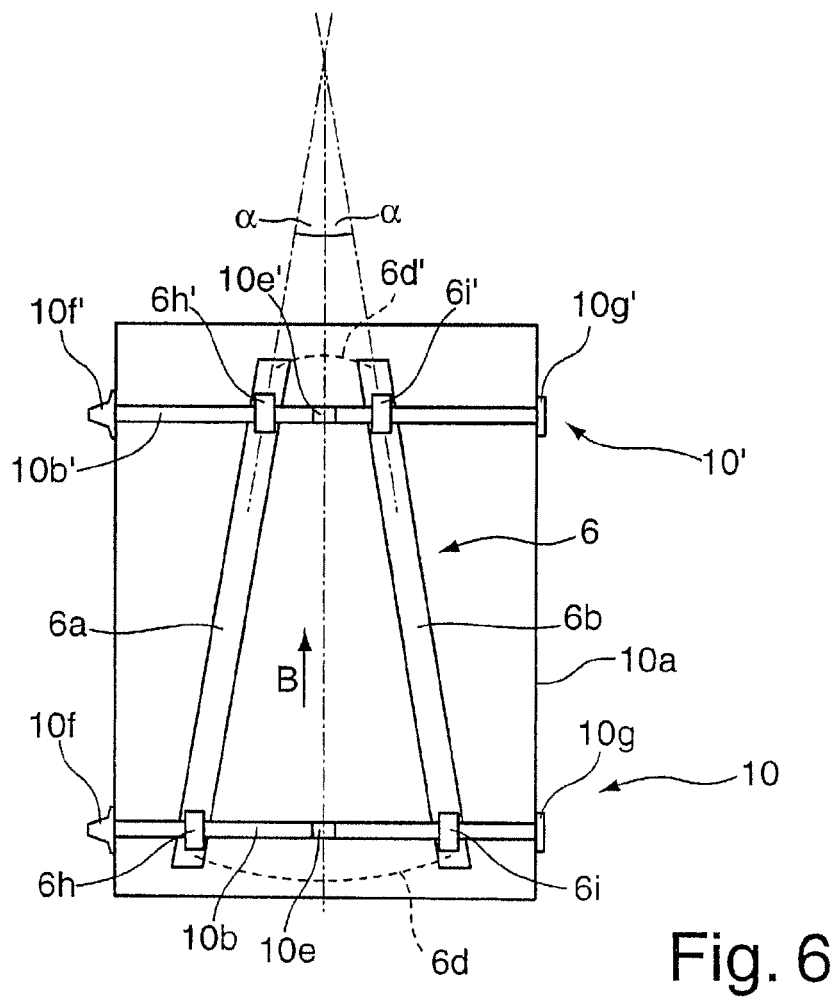
FIG. 6 is a top view of the arrangement according to FIG. 5, in which two adjustment devices are arranged in sequence.

FIG. 6 shows a top view of an arrangement in which two adjustment devices 10, 10' (shown in FIG. 5) are arranged in sequence in the direction of the container motion B and mounted in a common structural element 10a. The individual elements of FIG. 6 are clear in particular from FIGS. 2 to 5, so that it is unnecessary at present to discuss them in further detail. As shown, by activating the adjustment devices 10, 10' differently, an angularly-symmetric arrangement of the two coil halves 6a, 6b in relation to the container direction of motion B can be achieved, wherein the angle between the direction of motion B and the respective longitudinal axis of the coil halves is referred to by α. This positioning of the coil halves produces an increasing intensity of the induction effect in the direction of the container motion B. The reverse arrangement (increasing distance d in the direction of the container motion B) is also possible.

To facilitate positioning of the coil halves, it may be necessary to implement the connection between the coil halves 6a, 6b and the respective attachment parts 6h, 6i flexibly, in particular in a rotatable manner.

Figure 7:
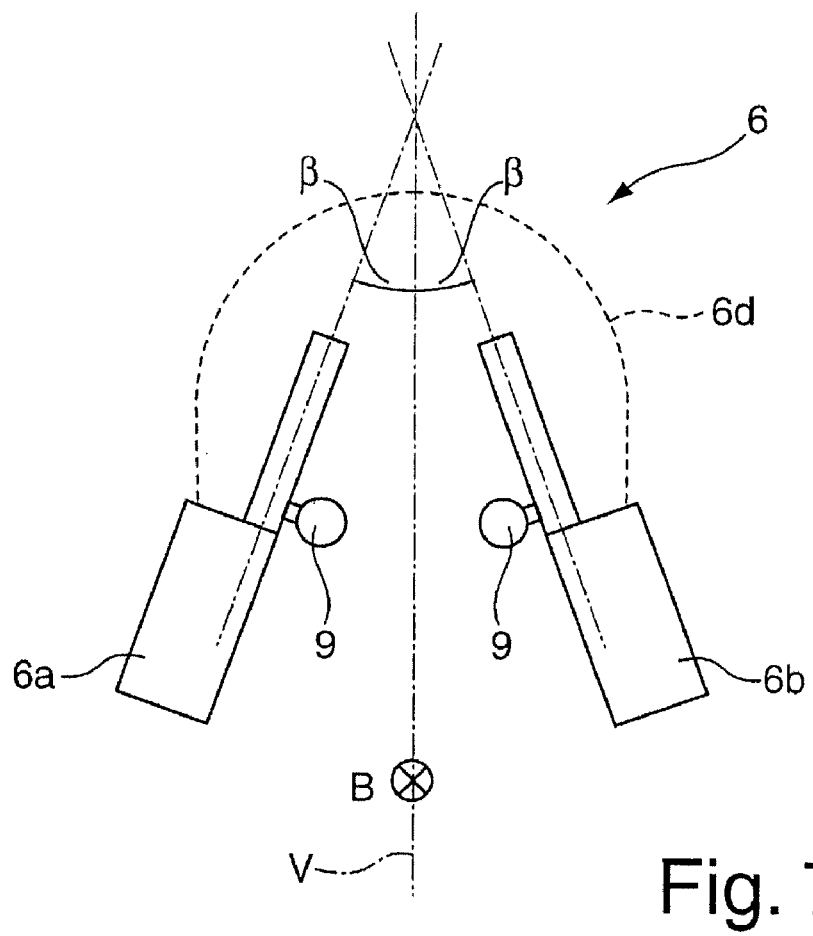
FIG. 7 shows a further configuration of the induction coil of the inventive sealing device.

FIG. 7 shows a further configuration of the induction coil 6. FIG. 7 is similar to FIG. 5 in that the container direction of motion B again extends into the page. Due to the flexible configuration of the conductor in the region of the conductor loop(s) 6d, it is also possible to implement any desired relative arrangement of the two coil halves 6a, 6b in a plane perpendicular to the container direction of motion B. In this instance the two coil halves 6a, 6b are each tilted inwards by an angle β relative to the vertical V. The reverse arrangement (tilting outwards) is also possible. When using the configuration shown in FIG. 7 the adjustment device 10 may be configured with separate threaded bolts (not shown) for the separate movement/tilting of the individual coil halves 6a, 6b, or the adjustment device may be configured completely differently if desired. An alignment of the coil halves 6a, 6b parallel to the vertical V can also be implemented in this way, but with a specific height offset to the other respective half of the coil.

As the person skilled in the art will recognize, the angled arrangements according to FIG. 6 and FIG. 7 are not fundamentally limited to symmetric arrangements.

As FIG. 8 shows, in simplified schematic form, a sealing head 1a in which the induction coil 6 and adjustment device 10 are mounted on a frame part or support part 11. The sealing head 1a also comprises the capacitance or capacitances 5, 5' and a connection device 12 for connecting the induction coil 6 or the resonant circuit 4 formed from the induction coil 6 and capacitances 5, 5' (compare FIG. 1) to the HF generator 3. Referring to FIG. 1, the above mentioned elements thus form the sealing head 1a of the sealing device 1. Together with these, flexible connectors 13, such as cables or the like, are used for connecting the connection device 12, to allow the sealing head 1a of an existing sealing device 1 to be replaced in a simple way.

A number of embodiments of the invention have been described. Nevertheless, it will be understood that various modifications may be made without departing from the spirit and scope of the invention. Accordingly, other embodiments are within the scope of the following claims.

What is claimed is:

1. A sealing device for the inductive sealing of openings of containers that are moved through the sealing device such that the openings form a plane, comprising
    an induction coil comprising one or more windings, wherein each winding comprises
        first and second straight conductor sections arranged in a plane parallel to the plane of the container openings and spaced a distance apart sufficient to enable the container openings to move between the first and second straight conductor sections, wherein the first and second straight conductor sections are arranged to be movable such that the distance and an angle between them can be altered; and first and second flexible conductor loop sections extending out of the plane of the container openings, wherein the first flexible conductor loop section connects first ends of the first and second straight conductor sections and the second flexible conductor loop section connects second ends of the first and second straight conductor sections or connects a second end of the second straight conductor section to a connector to a generator, and wherein the first and second flexible conductor loop sections form a tunnel shape through which the container openings can pass.

2. The sealing device according to claim 1, further comprising at least one coil adjustment device configured to adjust the relative arrangement of the first and second straight conductor sections of the inductor coil.

3. The sealing device according to claim 2, further comprising a guiding device configured to guide movement of the containers.

4. The sealing device of claim 3 wherein the coil adjustment device and at least one guide adjustment device for the guiding device are cooperatively coupled and/or are constructed in the form of a joint adjustment device.

5. The sealing device according to claim 1, wherein the induction coil is coupled with at least one capacitance in an electronic circuit to form a resonant circuit.

6. The sealing device according to claim 5 wherein the induction coil and the capacitance are connected in series.

7. The sealing device according to claim 5, wherein the resonant circuit has a connector configured to provide a flexible connection to a high-frequency generator.

8. The sealing device according to claim 1, wherein at least one of the first and second flexible conductor loop sections extends perpendicular to the plane of the container openings.

9. The sealing device according to claim 1, wherein the first and second flexible conductor loop sections are both formed from litz wire.

10. The sealing device according to claim 1, wherein the induction coil is constructed with multiple windings.

11. The sealing device according to claim 1, wherein the angle is determined in relation to a direction of motion (B) of the containers.

12. The sealing device according to claim 1, wherein the angle is determined in relation to a direction perpendicular to a direction of motion (B) of the containers.

13. The sealing device according to claim 1, wherein the first and second straight conductor sections of the induction coil are movable in a direction perpendicular to a direction of motion (B) of the containers.

14. The sealing device according to claim 1, wherein the induction coil is divided into multiple sub-coils and a capacitance is connected between each of the sub-coils.

15. The sealing device according to claim 1, wherein the first and second straight conductor sections of the inductor coil are surrounded at least partially by an enclosure made from a material which has good magnetic conductivity and poor electrical conductivity.

16. A sealing device for the inductive sealing of openings of containers that are moved through the sealing head such that the openings form a plane, comprising
    (a) a high-frequency generator;
    (b) an induction coil; and
    (c) a connector configured to connect the induction coil to the high-frequency generator; wherein the induction coil comprises one or more windings, wherein each winding comprises first and second straight conductor sections arranged in a plane parallel to the plane of the container openings and at a distance apart sufficient to enable the container openings to move between the first and second straight conductor sections, wherein the first and second straight conductor sections are arranged to be movable such that the distance and an angle between them can be altered; and first and second flexible conductor loop sections extending out of the plane of the container openings, wherein the first flexible conductor loop section connects first ends of the first and second straight conductor sections and the second flexible conductor loop section connects second ends of the first and second straight conductor sections or connects a second end of the second straight conductor section to the connector, and wherein the first and second flexible conductor loop sections form a tunnel shape through which the container openings can pass.

17. The sealing device of claim 16, wherein the induction coil is coupled with at least one capacitance in an electronic circuit to form a resonant circuit and the connector is configured to connect the induction coil to the capacitance.

18. The sealing device of claim 16, further comprising at least one coil adjustment device configured to adjust the relative arrangement of the first and second straight conductor sections of the induction coil, wherein the connector is configured to connect the induction coil to the coil adjustment device.

19. The sealing device of claim 16, further comprising a guiding device configured to guide movement of the containers and at least one guide adjustment device for the guiding device, wherein the connector is configured to connect the induction coil to the guide adjustment device.

20. The sealing device according to claim 16, wherein at least one of the first and second flexible conductor loop sections extends perpendicular to the plane of the container openings.

* * * * *